March 30, 1948. F. L. TURBETT ET AL 2,438,524
RAW MATERIAL FOR CERAMIC GLAZES
Filed May 16, 1944

INVENTORS
FORREST L. TURBETT
HARRY B. STEPHENSON JR.
BY Chester Tietig
ATTORNEY

Patented Mar. 30, 1948

2,438,524

UNITED STATES PATENT OFFICE 2,438,524

RAW MATERIAL FOR CERAMIC GLAZES

Forrest L. Turbett and Harry B. Stephenson, Jr., Joplin, Mo., assignors to The Eagle-Picher Company, Cincinnati, Ohio, a corporation of Ohio Application May 16, 1944, Serial No. 535,890

8 Claims. (Cl. 106—49)

This invention relates to a raw material for making ceramic glazes. This material is distinguished by its low solubility as judged by the standard test of boiling the powder composition for a half hour in acetic acid of a strength of 4% by volume. Under these conditions the substance which is the subject matter of this invention shows a solubility of 3% by weight or lower. A substance showing such a low solubility has long been sought by that part of the ceramic industry which uses lead containing glazes. A lead containing substance of this degree of insolubility is considered by recognized authorities to be substantially non-toxic. This new material is therefore intended to be a substance by the use of which lead can be incorporated into a glaze batch under the most hygienic conditions.

Briefly described, our composition is a homogeneous light yellow-colored or whitish incipiently fused mixture of minute crystalline habit. The shape of the crystals is as yet undetermined. It consists predominantly of crystalline lead disilicate, finely divided unreacted china clay and silica. While the composition is, in its preferred form, easily crushable, in fact, in most cases crushable by the human hand, nevertheless it may be also semi-vitreous in places, and non-crushable except with tools or machines. It is always more or less porous and may show some liquid absorption, wherein it differs from glass.

The analysis of the product may be varied but a properly prepared product falling within the following range of constituents will have the desired properties:

|  | Per cent by weight |
|---|---|
| $PbO$ | 65.01 to 61.35 |
| $SiO_2$ | 34.89 to 26.41 |
| $Al_2O_3$ | 0.10 to 12.24 |

The above analysis is not to be interpreted as stating that the constituents listed are present as such, but rather that the alumina, lead and silica would be present in the proportions listed if they were in the state of oxidation given.

Our method of producing the composition is as follows:

A furnace charge is made within the above range of proportions, the PbO having fine particle size; for example, 2.0 microns median radius. The silica (glass sand) is ground to —300 mesh, and the alumina (kaolin $H_4Al_2Si_2O_9$ (which corresponds to $SiO_2$ 46.5%, $Al_2O_3$ 39.5% and $H_2O$ 14%) the same fineness. It is to be noted that these substances are extremely fine. They are conveniently prepared by separate ball milling, although any suitable method of preparation may be used.

The three components are mixed thoroughly before heating, preferably while dry. A satisfactory mixture is made by rotating in a ball mill at 50 R. P. M. for 4 hours. The charge is then placed in a gas-fired reverberatory or electric furnace and heated to incipient fusion in an oxidizing or neutral atmosphere at from 1230° to 1400° F. (650 C. to 760° C.). The time of heating should approximate 2 to 4 hours, and should be continued until a color change from a characteristic straw color to light yellow occurs.

This silicate product can be used most effectively in raw ceramic glazes, although in some instances it may find application in fritted glazes. It may be ground into a powder of varying degrees of fineness, the more generally accepted being —10 mesh U. S. Standard, or —100 mesh U. S. Standard.

As the preferred form of our invention, we make a composition of the following ingredients:

|  | Per cent by weight |
|---|---|
| Georgia kaolin finer than 300 mesh U. S. Standard | 17.40 |
| Litharge (2.0 microns median radius) | 59.80 |
| Silica (ground glass sand) finer than 300 mesh | 22.80 |
|  | 100.00 |

This charge is mixed in a rotary mixer at 50 R. P. M. for 3 hours and then heated in a gas-fired reverberatory furnace using an oxidizing flame for 4 hours to 1382° F. (750° C.). It is taken from the furnace while at this temperature and transferred to a steel cart with free access of air. After cooling, it is crushed in a jaw crusher and then through a pair of rolls. It is then screened to —10 mesh.

It should be stated that alumina has been found to be the only desolubilizing agent so far found to be effective. We are aware that MgO and CaO have been used in compositions containing lead silicate which were intended for non-analogous purposes. MgO and CaO are not equivalents of $Al_2O_3$ in the form of aluminum silicate or other form, since it will not give our desired result. The solubility of the product made with MgO is 100% more than ours, using the boiling 4% acetic acid test.

In our process, other lead compounds, for example $Pb_3O_4$, basic carbonate white lead or basic sulfate white lead may be substituted for PbO without departing from the spirit of the invention. Aluminum hydrate, or calcined alumina may be substituted for kaolin. Pure diatomaceous earth or Tripoli or ground quartz may be the source of silica, but prefer to use pure glass sand.

Our product is exceptionally pure. We attribute this purity to the fact that we do not take the furnace charge to complete fusion. Consequently, no refractory lining from furnace or crucible is dissolved in the charge, thus preserving the purity and adding to the life of the lining.

In order to assist identification of our composition regardless of its permissible variation in surface appearance, we show in the accompanying illustrations the characteristic microscopic appearance, and the appearance of the characteristic X-ray diffraction diagram of both the incipiently fused and completely fused products.

According to Professor G. L. Clark of the University of Illinois, and diffraction patterns which he has prepared, there is unreacted china clay and unreacted silica in the incipiently fused finished product made according to this invention, but that all lead is in the combined state as lead di-silicate. There is no crystalline lead aluminum silicate present.

Figure 1:
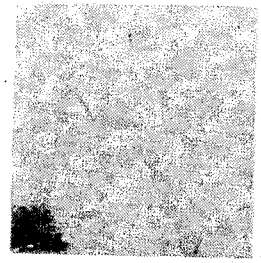
Figure 1 is a photo-micrograph showing at a magnification of 4,000, the minutely crystalline appearance of the product made by incipient fusion.
Figure 2:
Figure 2 is a corresponding micro-photograph showing the glassy fracture of a corresponding product made by complete fusion.
Figure 3:
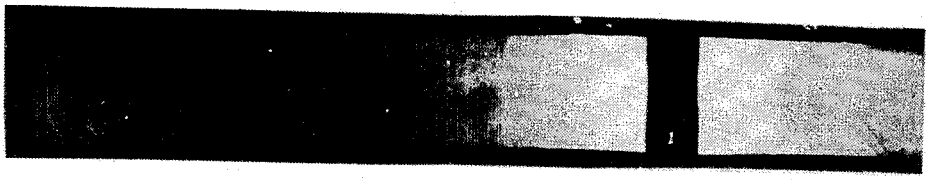
Figure 3 is an X-ray diffraction pattern showing the distinct rings due to a definite crystal structure in the incipiently fused product.
Figure 4:
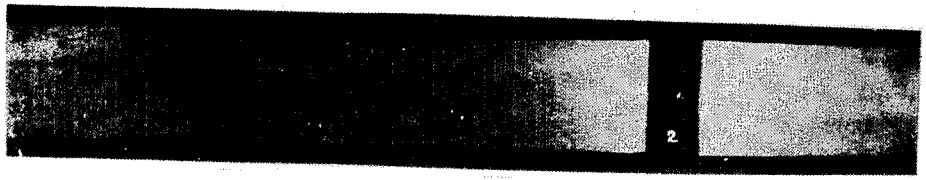
Figure 4 is an X-ray diffraction pattern of the corresponding product made by complete fusion. It has the diffuse appearance characteristic of glasses.

Referring again to Figure 3, the following is a table of interplanar distances (d-values) as shown by the diffraction pattern. The table has been prepared by Professor Clark and made according to the methods described by him and others in the symposium on X-ray methods published in 1936 by the American Society for Testing Materials. The values in this table are given in Angstrom units, each one of these being $10^{-8}$ cm.

| | |
|---|---|
| 3.49 | 1.93 |
| 2.93 | 1.69 |
| 2.72 | 1.63 |
| 2.28 | 1.49 |

We claim as our invention:

1. A composition of matter consisting of a major proportion by weight of a lead oxide, a minor proportion of silica, and a small proportion of alumina, said composition being the light yellow homogeneous product of the incipient fusion of PbO, $SiO_2$ and $H_4Al_2Si_2O_9$, all in finely divided form and thoroughly mixed before heating.

2. The process of making a low solubility raw material for ceramic glazes which comprises heating to incipient fusion in an oxidizing or neutral atmosphere a composition comprising a major proportion of a lead oxide and a finely divided silica, these being present in the proportions substantially those in which they occur in lead di-silicate, and a minor proportion of finely divided aluminum silicate, all constituents being thoroughly mixed, then cooling after incipient fusion and crushing the product to the fineness customarily used for glazes.

3. A raw material for ceramic glazes distinguished by its low solubility in boiling 4% acetic acid, said material being the product of the incipient fusion of—

| | Percent by weight |
|---|---|
| Kaolin of very fine particle size, approximately | 17.40 |
| Litharge of very fine particle size, approximately | 59.80 |
| Silica of very fine particle size, approximately | 22.80 | said product containing no uncombined lead oxide, but containing unreacted kaolin and having a minute crystalline habit as shown by its X-ray diffraction pattern.

4. A raw material for ceramic glazes distinguished by its low solubility in boiling 4% acetic acid and being the minutely crystalline product of the incipient fusion of a small proportion of kaolin, a major proportion of lead oxide and a minor proportion of silica, said product giving an X-ray diffraction pattern in which the interplanar spaces are arranged substantially as in the following series:

(d-Values in Angstrom units)—

| | |
|---|---|
| 3.49 | 1.93 |
| 2.93 | 1.69 |
| 2.72 | 1.63 |
| 2.28 | 1.49 |

5. A composition of matter, useful as a low solubility raw material for glazes for ceramics which comprises the product of the heating together to about 705° C. of the following thoroughly mixed constituents in finely divided form until a change of color from straw to light yellow occurs:

| | Per cent by weight |
|---|---|
| Kaolin of very fine particle size, approximately | 17.40 |
| Litharge of very fine particle size, approximately | 59.80 |
| Silica of very fine particle size, approximately | 22.80 | said product being further characterized by being crushable, minutely crystalline and having a solubility in boiling 4% acetic acid of not more than 3.0% after 30 minutes boiling.

6. A definitely crystalline, crushable homogeneous substance, useful in ceramic glazes, vitreous enamels and glass manufacture, characterized by a low solubility in boiling 4% acetic acid, said composition being the light yellow product of the incipient fusion of the following:

| | Per cent by weight |
|---|---|
| PbO | 65.01 to 61.35 |
| $SiO_2$ | 34.89 to 26.41 |
| $Al_2O_3$ | 0.10 to 12.24 | said product containing no uncombined lead oxide and having a minutely crystalline habit.

7. A yellowish white, crystalline, crushable, homogeneous substance useful in ceramic glazes and characterized by a low solubility in boiling 4% acetic acid, said composition being the product of the incipient fusion of a finely divided lead oxide, finely divided $SiO_2$, and a minor proportion of a finely divided member of the group consisting of alumina, aluminum hydroxide and aluminum silicate, said constituents having been mixed with each other before the mixture is heated.

8. A yellowish white, crystalline, crushable, homogeneous substance useful in ceramic glazes and characterized by a low solubility in boiling 4% acetic acid, said composition being the product of the incipient fusion of finely divided lead oxide and silica in proportions substantially those required to produce lead di-silicate and from 0.10% to 12.24% by weight of alumina derived from a finely divided member of the group consisting of alumina, aluminum hydroxide and aluminum silicate, said constituents having been well mixed with each other before the mixture is heated.

FORREST L. TURBETT.
HARRY B. STEPHENSON, Jr.

REFERENCES CITED

The following references are of record in the file of this patent:

Dana's Manual of Mineralogy (Ford 13th ed.), page 281.